(12) United States Patent
Pang et al.

(10) Patent No.: US 10,425,955 B2
(45) Date of Patent: Sep. 24, 2019

(54) BEARER SETUP METHOD AND APPARATUS

(71) Applicant: HUAWEI TECHNOLOGIES CO., LTD., Shenzhen, Guangdong (CN)

(72) Inventors: Lingli Pang, Shanghai (CN); Xiaoxiao Zheng, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 15/824,946

(22) Filed: Nov. 28, 2017

(65) Prior Publication Data
US 2018/0084565 A1 Mar. 22, 2018

Related U.S. Application Data

(63) Continuation of application No. PCT/CN2015/080369, filed on May 29, 2015.

(51) Int. Cl.
H04W 72/10 (2009.01)
H04W 72/08 (2009.01)
(Continued)

(52) U.S. Cl.
CPC ......... *H04W 72/087* (2013.01); *H04W 72/10* (2013.01); *H04W 76/10* (2018.02);
(Continued)

(58) Field of Classification Search
CPC ......... H04W 72/0413; H04W 72/0453; H04W 72/087; H04W 72/10; H04W 76/02; H04W 76/046; H04W 76/10; H04W 76/27
See application file for complete search history.

(56) References Cited

U.S. PATENT DOCUMENTS 9,433,032 B1*  8/2016  Ghadge .................. H04W 84/08
2010/0226372 A1*  9/2010  Watanabe ......... H04L 29/12066
                                                          370/392
(Continued)

FOREIGN PATENT DOCUMENTS

CN          1845635 A       10/2006
CN          1905736          1/2007
(Continued)

OTHER PUBLICATIONS

Extended European Search Report issued in European Application No. 15893625.2 dated Mar. 23, 218, 13 pages.
(Continued)

*Primary Examiner* — Jean A Gelin
(74) *Attorney, Agent, or Firm* — Fish & Richardson P.C.

(57) ABSTRACT

The present disclosure describes a bearer setup method and an apparatus. The method includes: transmitting, by a user equipment, a request message to a control node, where the request message is used to request setup of a transmission bearer for transmitting a data packet of a service between the user equipment and the control node, and the request message includes a parameter of the service; receiving, by the user equipment, a response message transmitted by the control node in response to the request message, where the response message includes configuration information of the transmission bearer; and setting up, by the user equipment, the transmission bearer with the control node according to the configuration information.

21 Claims, 3 Drawing Sheets

(51) Int. Cl.
*H04W 76/10* (2018.01)
*H04W 76/27* (2018.01)
*H04W 72/04* (2009.01)

(52) U.S. Cl.
CPC ........ *H04W 76/27* (2018.02); *H04W 72/0413* (2013.01); *H04W 72/0453* (2013.01)

(56) References Cited

U.S. PATENT DOCUMENTS

| | | | |
|---|---|---|---|
| 2012/0076109 A1 | 3/2012 | Lindholm et al. | |
| 2014/0029530 A1 | 1/2014 | Kim et al. | |
| 2014/0119178 A1* | 5/2014 | Zhao | H04W 28/0268 370/230 |
| 2014/0301288 A1* | 10/2014 | Koc | H04W 4/70 370/329 |
| 2014/0302811 A1 | 10/2014 | Chen et al. | |
| 2015/0296559 A1* | 10/2015 | Liu | H04W 36/26 370/329 |
| 2015/0358340 A1* | 12/2015 | Wang | H04W 12/12 726/23 |
| 2016/0183135 A1* | 6/2016 | Kang | H04W 76/15 455/444 |
| 2016/0212779 A1 | 7/2016 | Zhao et al. | |
| 2016/0323919 A1* | 11/2016 | Xu | H04W 48/08 |
| 2017/0366960 A1* | 12/2017 | Kim | H04W 28/02 |
| 2017/0374542 A1* | 12/2017 | Ryu | H04W 8/08 |
| 2018/0109972 A1* | 4/2018 | Kim | H04W 28/02 |
| 2018/0139762 A1* | 5/2018 | Cho | H04W 4/90 |

FOREIGN PATENT DOCUMENTS

| | | |
|---|---|---|
| CN | 1984466 | 6/2007 |
| CN | 102158911 A | 8/2011 |
| CN | 102438277 A | 5/2012 |
| CN | 102811462 | 12/2012 |
| EP | 2501197 A1 | 9/2012 |
| EP | 2717619 A1 | 4/2014 |
| GB | 2512393 A | 10/2014 |
| JP | 2014531848 A | 11/2014 |
| WO | 2014165657 A1 | 10/2014 |

OTHER PUBLICATIONS

3GPP TS 36.331 V12.5.0 (Mar. 2015),3rd Generation Partnership Project;Technical Specification Group Radio Access Network;Evolved Universal Terrestrial Radio Access (E-UTRA);Radio Resource Control (RRC);Protocol specification (Release 12),total 445 pages.
International Search Report in International Application No. PCT/CN2015/080369, dated Feb. 16, 2016, 6 pages.
S2-124788 (revision of S2-124520) Qualcomm Incorporated,"Signalling overhead reduction for small data transmission over user plane (LTE)",SA WG2 Meeting #94,New Orleans, USA—Nov. 12-16, 2012,total 7 pages.
Japanese Office Action issued in Japanese Application No. 2017-561854 dated Dec. 3, 2018, 8 pages.
Office Action issued in Chinese Application No. 201580067608.9 dated Apr. 12, 2019, 23 pages (with English translation).
Communication pursuant to Article 94(3) EPC issued in European Application No. 15893625.5 dated Jul. 10, 2019, 5 pages.

* cited by examiner

BEARER SETUP METHOD AND APPARATUS

CROSS-REFERENCE TO RELATED APPLICATIONS

This application is a continuation of International Application No. PCT/CN2015/080369, filed on May 29, 2015, the disclosure of which is hereby incorporated by reference in its entirety.

TECHNICAL FIELD

The present invention relates to the field of communications technologies, and in particular, to a bearer setup method and an apparatus.

BACKGROUND

In existing evolved universal terrestrial radio access network (E-UTRAN) technologies, when user equipment has an incoming service and needs to set up a bearer, steps S101 to S109 shown in FIG. 1 need to be performed.

Random access is first performed between the UE and an eNB to obtain resources. Setup of a signaling connection and exchange of parameters of encryption and integrity protection between the UE and the eNB are then started. A service bearer is last set up between the UE and the eNB, and setup of the bearer is complete.

From the perspective of air interface transmission, seven pieces of signaling need to be exchanged between the UE and the eNB. In addition, an interaction process between the eNB and the MME is required to determine whether a service of the UE can be set up, and to allocate corresponding bearer parameters.

Subsequently, the UE may transmit a data packet of the service to the eNB. Consequently, many network resources and a relatively long time are consumed in the process, affecting user experience and consuming many air interface resources.

SUMMARY

The present invention provides a bearer setup method. The method and an apparatus provided in the present invention resolve a prior-art problem that many network resources and a relatively long time are consumed when a bearer is set up between UE and a network side.

According to a first aspect, a bearer setup method is provided, and the method includes:
transmitting, by user equipment, a request message to a first control node, where the request message is used to request setup of a transmission bearer for transmitting a data packet of a service between the user equipment and the first control node, and the request message includes a parameter of the service;
receiving, by the user equipment, a response message transmitted by the first control node in response to the request message, where the response message includes configuration information of the transmission bearer; and
setting up, by the user equipment, the transmission bearer with the first control node according to the configuration information.

With reference to the first aspect, in a first possible implementation, the parameter of the service includes:
a service type of the service, where the service type includes any one or a combination of an ultra-reliable service, a short delay service, a small-sized packet transmission service, a streaming service, or a conversational service;
a service feature of the service, where the service feature includes any one or a combination of a size of the data packet of the service, a transmission interval of the data packet, a delay requirement of the data packet, or a rate requirement of the data packet;
quality of service (QoS) corresponding to the service;
a quality of service class identifier (QCI) parameter; or
at least one of the following: an address of a source server corresponding to the service, an address of a destination server corresponding to the service, or an access point name corresponding to the service.

According to a second aspect, a bearer setup method is provided, and the method includes:
receiving, by a first control node, a request message transmitted by user equipment, where the request message is used to request setup of a transmission bearer for transmitting a data packet of a service, and the request message includes a parameter of the service;
correspondingly generating, by the first control node, a first response message according to the parameter of the service, where the response message includes configuration information of the transmission bearer; and the configuration information is used to set up the transmission bearer between the first control node and the user equipment.

With reference to the second aspect, in a first possible implementation, the parameter of the service includes:
a service type of the service, where the service type includes any one or a combination of an ultra-reliable service, a short delay service, a small-sized packet transmission service, a streaming service, or a conversational service;
a service feature of the service, where the service feature includes any one or a combination of a size of the data packet of the service, a transmission interval of the data packet, a delay requirement of the data packet, or a rate requirement of the data packet;
quality of service (QoS) corresponding to the service;
a quality of service class identifier (QCI) parameter; or
at least one of the following: an address of a source server corresponding to the service, an address of a destination server corresponding to the service, or an access point name corresponding to the service.

With reference to the second aspect or the first possible implementation of the second aspect, in a second possible implementation, the method further includes:
transmitting, by the first control node, indication information to a second control node, where the indication information is used to indicate that the first control node agrees to set up the transmission bearer with the user equipment.

With reference to the second aspect or the first possible implementation of the first aspect, in a third possible implementation, the method further includes:
transmitting, by the first control node, a transmission bearer setup request to a second control node, where the transmission bearer setup request is used to request setup of a data transmission channel between the first control node and the second control node; and
receiving, a feedback message of the second control node in response to the transmission bearer setup request, where the feedback message includes an address of the data transmission channel on the second control node; and setting up the data transmission channel with the second control node according to the address of the data transmission channel on the second control node.

With reference to the second aspect or the first possible implementation of the first aspect, in a fourth possible implementation, the method further includes:

receiving, by the first control node, admission parameter information of a second control node, where the admission parameter information includes one or a combination of load information, bandwidth information, capacity information, or a supported service parameter of the second control node; and determining, by the first control node according to the admission parameter information, whether to set up the transmission bearer with the user equipment.

According to a third aspect, a bearer setup method is provided, and the method includes:

transmitting, by a second control node, admission parameter information to a first control node, so that the first control node determines, according to the admission parameter information, whether to set up a transmission bearer with user equipment, where the admission parameter information is used to indicate a type of a service or device admitted by the second control node.

With reference to the third aspect, in a first possible implementation, the admission parameter information includes one or a combination of load information, bandwidth information, capacity information, or a supportable service parameter of the second control node.

With reference to the third aspect or the first possible implementation of the third aspect, in a second possible implementation, the transmitting, by a second control node, admission parameter information to a first control node includes:

periodically transmitting, by the second control node, the admission parameter information to the first control node;

transmitting the admission parameter information to the first control node after admission parameter transmission request information of the first control node is received; or transmitting, by the second control node, the admission parameter information to the first control node when the second control node detects that the admission parameter information of the second control node is changed.

With reference to the third aspect, or the first possible implementation of the first aspect, in a third possible implementation, the method further includes:

receiving, by the second control node, indication information transmitted by the first control node, where the indication information is used to indicate that the first control node agrees to set up the transmission bearer with the user equipment.

With reference to the third aspect or any one of the first to third possible implementations of the first aspect, in a fourth possible implementation, the method further includes:

receiving, by the second control node, a transmission bearer setup request transmitted by the first control node, where the transmission bearer setup request is used to set up a data transmission channel between the first control node and the second control node; and obtaining, by the second control node, an address of the data transmission channel on the first control node from the transmission bearer setup request, and setting up the data transmission channel with the first control node according to the address of the data transmission channel on the first control node.

According to a fourth aspect, a terminal is provided, and the terminal includes:

a transmitter, configured to transmit a request message to a first control node, where the request message is used to request setup of a transmission bearer for transmitting a data packet of a service between the user equipment and the first control node, and the request message includes a parameter of the service;

a receiver, configured to receive a response message transmitted by the first control node in response to the request message, where the response message includes configuration information of the transmission bearer; and a processor, configured to set up the transmission bearer with the first control node according to the configuration information.

With reference to the fourth aspect, in a first possible implementation, the parameter of the service that is added by the transmitter to the request message includes:

a service type of the service, where the service type includes any one or a combination of an ultra-reliable service, a short delay service, a small-sized packet transmission service, a streaming service, or a conversational service;

a service feature of the service, where the service feature includes any one or a combination of a size of the data packet of the service, a transmission interval of the data packet, a delay requirement of the data packet, or a rate requirement of the data packet;

quality of service (QoS) corresponding to the service;

a quality of service class identifier (QCI) parameter; or at least one of the following: an address of a source server corresponding to the service, an address of a destination server corresponding to the service, or an access point name corresponding to the service.

According to a fifth aspect, a control node is provided, and the control node includes:

a receiver, configured to receive a request message transmitted by user equipment, where the request message is used to request setup of a transmission bearer for transmitting a data packet of a service, and the request message includes a parameter of the service; and a processor, configured to correspondingly generate a first response message according to the parameter of the service, where the response message includes configuration information of the transmission bearer; and the configuration information is used to set up the transmission bearer between the control node and the user equipment.

With reference to the fifth aspect, in a first possible implementation, the parameter of the service that is obtained by the processor from the request message includes:

a service type of the service, where the service type includes any one or a combination of an ultra-reliable service, a short delay service, a small-sized packet transmission service, a streaming service, or a conversational service;

a service feature of the service, where the service feature includes any one or a combination of a size of the data packet of the service, a transmission interval of the data packet, a delay requirement of the data packet, or a rate requirement of the data packet;

quality of service (QoS) corresponding to the service;

a quality of service class identifier (QCI) parameter; or at least one of the following: an address of a source server corresponding to the service, an address of a destination server corresponding to the service, or an access point name corresponding to the service.

With reference to the fifth aspect or the first possible implementation of the fifth aspect, in a second possible implementation, the control node further includes:
a first transmitter, configured to transmit indication information to a second control node, where the indication information is used to indicate that the control node agrees to set up the transmission bearer with the user equipment.

With reference to the fifth aspect or the first possible implementation of the first aspect, in a third possible implementation, the control node further includes:
a second transmitter, configured to transmit a transmission bearer setup request to a second control node, where the transmission bearer setup request is used to request setup of a data transmission channel between the control node and the second control node;
the receiver is further configured to receive a feedback message of the second control node in response to the transmission bearer setup request, where the feedback message includes an address of the data transmission channel on the second control node; and
the processor is further configured to set up the data transmission channel with the second control node according to the address of the data transmission channel on the second control node.

With reference to the fifth aspect or the first possible implementation of the first aspect, in a fourth possible implementation, the control node further includes:
the receiver is further configured to receive admission parameter information of a second control node, where the admission parameter information includes one or a combination of load information, bandwidth information, capacity information, or a supported service parameter of the second control node; and
the processor is further configured to determine, according to the admission parameter information, whether to set up the transmission bearer with the user equipment.

According to a sixth aspect, a control node is provided, and the control node includes:
a memory, configured to store admission parameter information; and
a transmitter, configured to transmit the admission parameter information to a first control node, so that the first control node determines, according to the admission parameter information, whether to set up a transmission bearer with user equipment, where the admission parameter information is used to indicate a type of a service or device admitted by the control node.

With reference to the sixth aspect, in a first possible implementation, the admission parameter information transmitted by the transmitter includes one or a combination of load information, bandwidth information, capacity information, or a supportable service parameter of the control node.

With reference to the sixth aspect, or the first possible implementation of the sixth aspect, in a second possible implementation, the transmitter is further specifically configured to periodically transmit the admission parameter information to the first control node; transmit the admission parameter information to the first control node after admission parameter transmission request information of the first control node is received; or transmit the admission parameter information to the first control node when the control node detects that the admission parameter information of the control node is changed.

With reference to the sixth aspect or the first possible implementation of the first aspect, in a third possible implementation, the control node further includes:
a first receiver, configured to receive indication information transmitted by the first control node, where the indication information is used to indicate that the first control node agrees to set up the transmission bearer with the user equipment.

With reference to the sixth aspect or any one of the first to third possible implementations of the first aspect, in a fourth possible implementation, the control node further includes:
a second receiver, configured to receive a transmission bearer setup request transmitted by the first control node, where the transmission bearer setup request is used to set up a data transmission channel between the first control node and the control node; and
a processor, configured to obtain an address of the data transmission channel on the first control node from the transmission bearer setup request, and set up the data transmission channel with the first control node according to the address of the data transmission channel on the first control node.

One or two of the foregoing technical solutions have at least the following technical effects.

In the solution, by directly performing user bearer allocation by a network side device that receives a bearer setup request message of user equipment, a process of service bearer setup of the user equipment can be quickly complete, so as to shorten a service setup delay of the user equipment, and reduce a signaling interworking process of an air interface.

DESCRIPTION OF EMBODIMENTS

To make the objectives, technical solutions, and advantages of embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

The following further describes the embodiments of the present invention in detail with reference to this specification.

Embodiment 1

Figure 1:
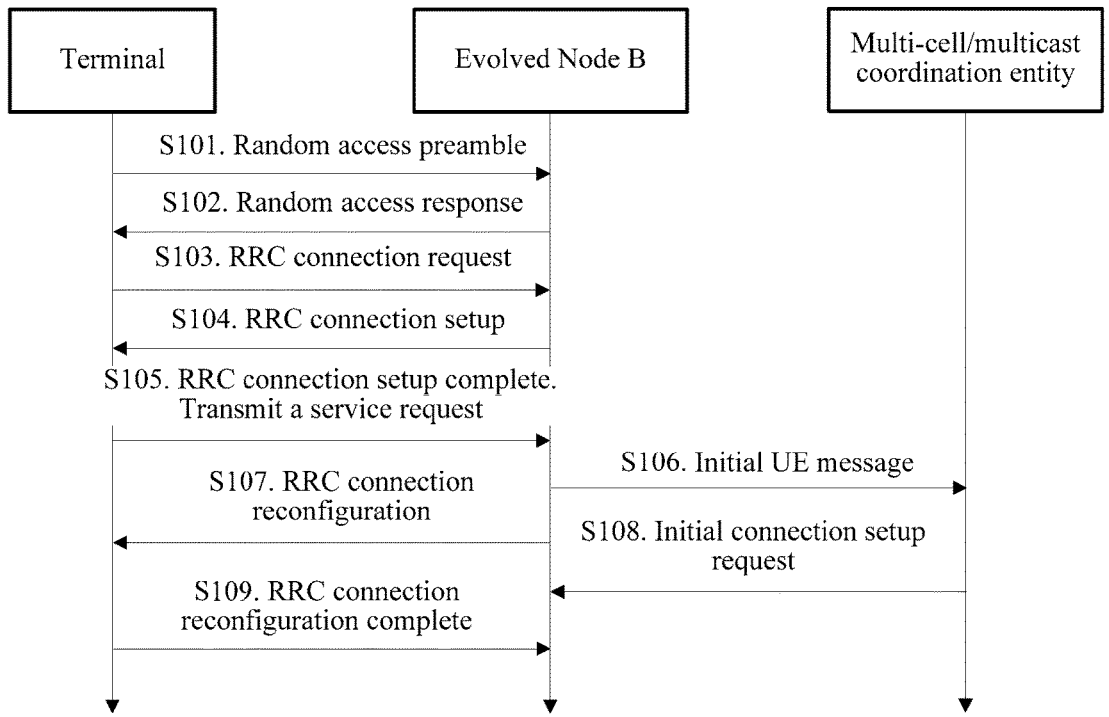
FIG. 1 is a schematic flowchart of bearer setup in the prior art.
Figure 2:
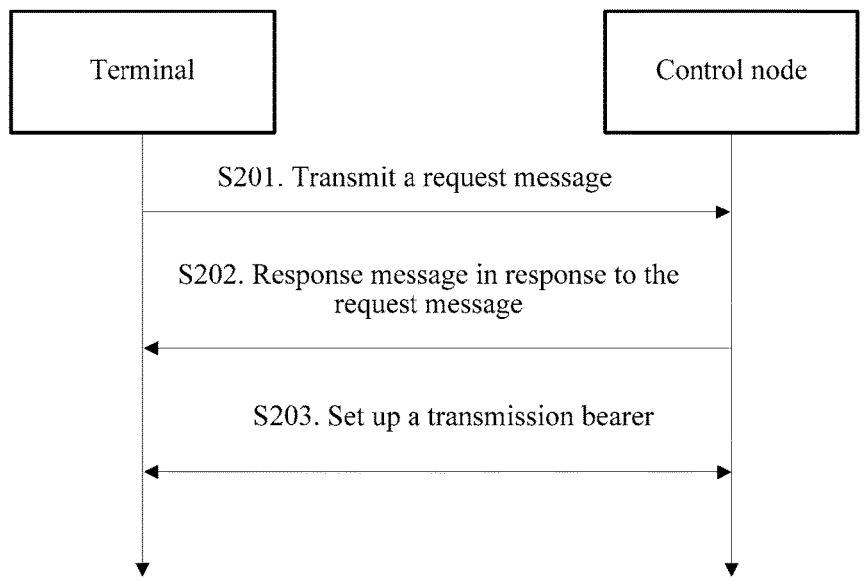
FIG. 2 is a schematic flowchart of a bearer setup method according to Embodiment 1 of the present invention.

As shown in FIG. 2, a bearer setup method is provided in this embodiment of the present invention, and the method includes the following steps.

Step 201: User equipment transmits a request message to a first control node, where the request message is used to request setup of a transmission bearer for transmitting a data packet of a service between the user equipment and the first control node, and the request message includes a parameter of the service.

Optionally, the request message may be a radio resource control (RRC) connection setup request message of the UE. Correspondingly, the first control node may be an evolved Node B (eNB) or a radio network controller (RNC).

The parameter of the service is a related parameter used to indicate the transmission bearer that is requested by the user equipment. The first control node may determine a type of the transmission bearer that is set up and a corresponding parameter according to the parameter of the service. In a specific usage environment, the following parameter may be selected as the parameter of the service, and may specifically include:

A. Service type of the service, where the service type includes any one or a combination of an ultra-reliable service, a short delay service, a small-sized packet transmission service, a streaming service, a conversational service, a background service or a delay-insensitive service;

B. Service feature of the service, where the service feature includes any one or a combination of a size of the data packet of the service, a transmission interval of the data packet, a delay requirement of the data packet, or a rate requirement of the data packet, where optionally, the data packet of the service is a data packet of an application layer;

C. Quality of service (QoS) corresponding to the service or a quality of service class identifier (QCI) parameter; or D. At least one of: an address of a source server corresponding to the service, an address of a destination server corresponding to the service, or an access point name corresponding to the service.

The foregoing service type and service feature are only examples. In specific implementation, there are more service types. For example, merely a machine type device or a sensor has many service types, and examples are not all listed herein.

Optionally, the foregoing parameter of the service may be subscription information of the user equipment, identification information of the user equipment, or a type of the user equipment such as a sensor device, a meter reading device or a logistics tracking device.

Because different services may correspond to different bearer requirements, when transmitting a request message of setting up a transmission bearer, user equipment adds a parameter of a service to the request message, so that the first control node can perform admission determining according to the parameter of the service in the request message when the first control node determines whether to allow transmission bearer setup of the user equipment (that is, whether a service requirement requested by the user equipment can be processed).

Step 202. The user equipment receives a response message transmitted by the first control node in response to the request message, where the response message includes configuration information of the transmission bearer.

In this embodiment, the response message is generated by the control node according to the parameter of the service and other factors. Optionally, for different services, different transmission bearers need to be configured. Therefore, configuration information of the transmission bearer is set according to the parameter of the service. Specifically, the configuration information may be specific parameter information, or may be a number of the transmission bearer agreed on by the first control node and the user equipment.

Step 203. The user equipment sets up the transmission bearer with the first control node according to the configuration information.

Optionally, after receiving a response message transmitted by the control node, the user equipment may transmit an acknowledgment message of the response message to the first control node. If an acknowledgment message needs to be transmitted to the first control node, after the user equipment receives a response message of the first control node in response to a bearer setup request message, the method further includes the following step.

Step 204. The user equipment transmits the acknowledgment message of the response message to the first control node.

In addition, if the control node determines to reject a request for setting up a transmission bearer by user equipment, the method further includes: transmitting, by the control node, a bearer setup rejection response to the user equipment, so as to reject a bearer setup request of the user equipment.

Embodiment 2

Figure 3:
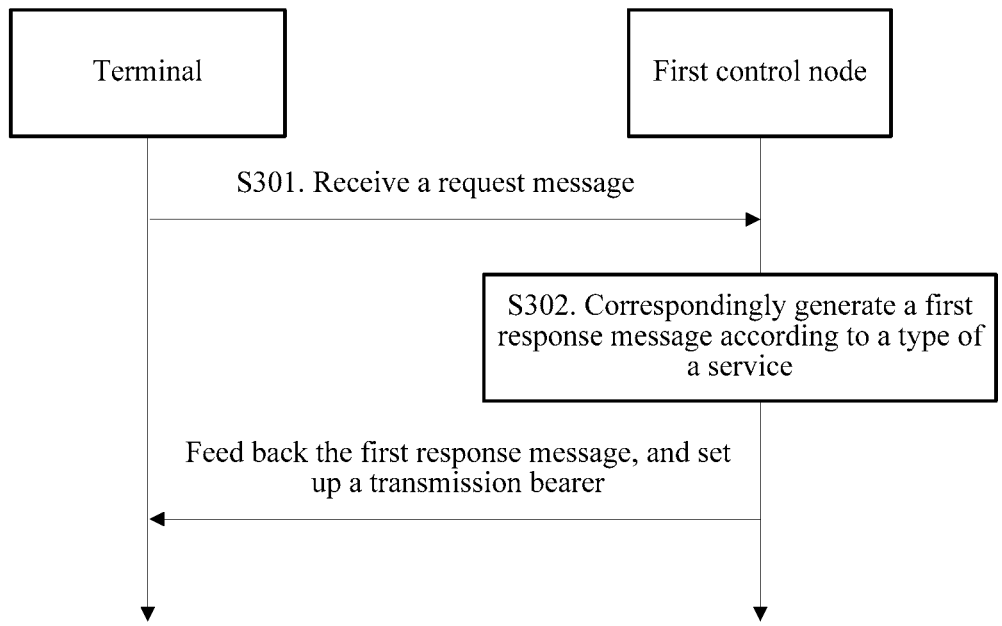
FIG. 3 is a schematic flowchart of a bearer setup method according to Embodiment 2 of the present invention.

As shown in FIG. 3, a bearer setup method is provided in this embodiment of the present invention, and the method specifically includes the following steps.

Step 301. A first control node receives a request message transmitted by user equipment, where the request message is used to request setup of a transmission bearer for transmitting a data packet of a service, and the request message includes a parameter of the service.

The parameter of the service is a related parameter used to indicate the transmission bearer that is requested by the user equipment. The first control node may determine a type of the transmission bearer that is set up and a corresponding parameter according to the parameter of the service. In a specific usage environment, the following parameter may be selected as the parameter of the service, and may specifically include:

A. Service type of the service, where the service type includes any one or a combination of an ultra-reliable service, a short delay service, a small-sized packet transmission service, a streaming service, a conversational service, a background service or a delay-insensitive service;

B. Service feature of the service, where the service feature includes any one or a combination of a size of the data packet corresponding to the service, a transmission interval of the data packet, or a delay requirement of the data packet;

C. Quality of service (QoS) corresponding to the service or a quality of service class identifier (QCI) parameter; or D. At least one of the following: an address of a source server corresponding to the service, an address of a destination server corresponding to the service, or an access point name corresponding to the service.

The foregoing service type is only an example. In specific implementation, there are more service types and service features. For example, merely a machine type device or a sensor has many service types, and examples are not all listed herein.

Optionally, the foregoing parameter of the service may be subscription information of the user equipment, identification information of the user equipment, or a type of the user equipment such as a sensor device, a meter reading device or a logistics tracking device.

Step 302. The first control node correspondingly generates a first response message according to the parameter of the service, where the first response message includes configuration information of the transmission bearer; and the configuration information is used to set up the transmission bearer between the first control node and the user equipment.

The configuration information in the first response message may be a default bearer identifier. The configuration information may include hybrid automatic repeat request (HARQ) information. Optionally, the user equipment and the first control node agree on a series of configuration parameters corresponding to the default bearer identifier.

In addition, if the first control node determines to reject a bearer setup request requested by the user equipment, the method further includes: transmitting, by the first control node, a bearer setup rejection response to the user equipment, so as to reject the bearer setup request of the user equipment.

In this embodiment, because the user equipment adds a parameter of a service to the request message when the user equipment sets up a bearing request, a control node receiving the request message (that is the first control node) may directly perform admission determining on the request of the user equipment.

In this embodiment, a second control node may further exist in a network side device. In this embodiment of the present invention, the second control node and the first control node may be in a same standard network or may be in different system networks. For example, in an evolved universal terrestrial radio access network (E-UTRAN) system, the first control node is an evolved Node B (eNB), and the second control node is a mobility management entity (MME) node in a core network. The first control node may further exchange related information with the second control node, and specific implementation includes the following steps.

1. Information exchanged is information about the user equipment admitted by the first control node, and the implementation specifically includes the following steps.

Step 401. The first control node transmits indication information to the second control node, where the indication information is used to indicate that the first control node agrees to set up the transmission bearer with the user equipment.

Optionally, the indication information further includes a parameter of a service of the user equipment.

Step 402. The first control node receives a second response message of the second control node in response to the indication information.

In a specific application environment, the first control node may determine, according to the second response message in step 402, that the first control node receives the indication information. In addition, the second control node may feed back no response information. In this case, the first control node considers by default that the second control node receives the indication information.

2. Information exchanged is setup information of the data transmission channel between the first control node and the second control node, and the implementation specifically includes the following steps.

Step 501. The first control node transmits a transmission bearer setup request to the second control node, where the transmission bearer setup request is used to request setup of a data transmission channel between the first control node and the second control node.

Step 502. Receive a feedback message of the second control node in response to the transmission bearer setup request, where the feedback message includes an address of the data transmission channel on the second control node; and set up the data transmission channel with the second control node according to the address of the data transmission channel on the second control node.

For example, in an evolved universal terrestrial radio access network (E-UTRAN) system, the second control node is a mobility management entity (MME) of a core network. By means of step 501 and step 502, an S1 interface for one piece of UE is set up between the eNB and the MME.

Optionally, a public data transmission channel or a default data transmission channel corresponding to a service may be used between the first control node and the second control node.

In this case, a process of exchanging transmission channel setup information is unnecessary.

3. Information exchanged is admission reference information of the second control node, and the implementation specifically includes the following steps.

Step 601. The first control node receives admission parameter information of the second control node, where the admission parameter information is used to indicate a type of a service or device that can be admitted by the second control node.

The admission parameter information includes one or a combination of load information, bandwidth information, capacity information, or a supported service parameter of the second control node.

Step 602. The first control node determines, according to the admission parameter information, whether to set up a transmission bearer with the user equipment.

In specific application, the first control node does not determine, only according to the admission parameter information, whether to set up a transmission bearer with the user equipment. The first control node further needs to determine, with reference to other factors, whether to set up a transmission bearer with the user equipment. The other factors may be: a service parameter for requesting setup of the transmission bearer, a load status of the first control node, and the like.

Specifically, the exchange of the admission parameter information may occur periodically, or may be triggered by the first control node, or initiatively initiated by the second control node, and this is not limited herein. For example, the second control node transmits the admission parameter information when load is relatively heavy or light, to determine a type of a service or device that can be admitted.

In this embodiment, a network side is merely divided only from a functional perspective by the first control node and the second control node. Optionally, the first control node may include a function of the second control node. In this case, the first control node and the second control node are a same network node. For example, the first control node is a network side device having functions such as radio resource control and service admission. The first control node is a device which combines some functions of the current radio network controller (or evolved Node B) and the core network. In an LTE system, the first control node is a control entity including functions of an eNB and a MME.

Optionally, if exchange of a related parameter needs to be encrypted, the first control node may transmit an encryption-related parameter to the UE, and receive the response message of the UE; or if an encryption parameter is transmitted by the second control node to the first control node, the first control node adds an encryption-related parameter to the response message when the first control node transmits the response message of bearer setup to the user equipment.

Embodiment 3

This embodiment of the present invention provides a bearer setup method, and the method specifically includes: transmitting, by a second control node, admission parameter information to a first control node, so that the first control node determines, according to the admission parameter information, whether to set up a transmission bearer with user equipment, where the admission parameter information is used to indicate a type of a service or device admitted by the second control node.

Optionally, specific implementations in which the second control node transmits the admission parameter information to the first control node are various, and several implementations are provided below:

A. The second control node periodically transmits the admission parameter information to the first control node;

B. Transmit the admission parameter information to the first control node after admission parameter transmission request information of the first control node is received; or C. The second control node transmits the admission parameter information to the first control node when the second control node detects that the admission parameter information of the second control node is changed. The change of the admission parameter information includes: parameter categories are added, for example, before the change, the load information and the bandwidth information are determined, and after the change, the capacity information further needs to be determined; or a change value of any parameter in the admission parameter information during a period of time exceeds a specified threshold.

In this embodiment, the admission parameter information includes one or a combination of load information, bandwidth information, capacity information, or a supportable service parameter of the second control node.

After the first control node determines, based on the admission parameter information transmitted by the second control node, whether to set up a transmission bearer with the user equipment, if the first control node agrees to set up the transmission bearer of the user equipment, optionally, the second control node can be notified in a manner of transmitting indication information to the second control node, and specific implementation can be: receiving, by the second control node, indication information transmitted by the first control node, where the indication information is used to indicate that the first control node agrees to set up the transmission bearer with the user equipment.

Optionally, the indication information further includes a service parameter for setting up the transmission bearer.

In addition, an inter-node transmission bearer may be set up between the first control node and the second control node, and specific implementation can be: receiving, by the second control node, a transmission bearer setup request transmitted by the first control node, where the transmission bearer setup request is used to set up a data transmission channel between the first control node and the second control node; and obtaining, by the second control node, an address of the data transmission channel on the first control node from the transmission bearer setup request, and setting up the data transmission channel with the first control node according to the address.

Optionally, the message of the indication information transmitted by the second control node to the first control node may further simultaneously include a transmission bearer setup request, to set up a data transmission channel between the first control node and the second control node.

The exchange of the admission parameter information and the indication information between the second control node and the first control node, and the setup of the data transmission channel are not limited to being implemented only in the order of the foregoing steps. For example, the data transmission channel may be set up before the indication information and the admission parameter information are transmitted.

Embodiment 4

Figure 4:
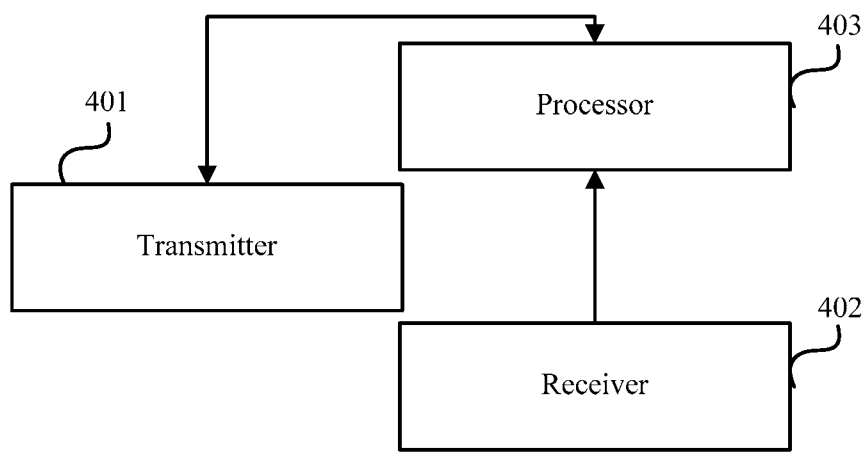
FIG. 4 is a schematic structural diagram of a terminal according to Embodiment 4 of the present invention.

As shown in FIG. 4, this embodiment of the present invention provides a terminal, and the terminal includes: a transmitter 401, a receiver 402 and a processor 40.

The transmitter 401 is configured to transmit a request message to a first control node, where the request message is used to request setup of a transmission bearer for transmitting a data packet of a service between the user equipment and the first control node, and the request message includes a parameter of the service.

The parameter of the service that is added by the transmitter 401 to the request message includes:

a service type of the service, where the service type includes any one or a combination of an ultra-reliable service, a short delay service, a small-sized packet transmission service, a streaming service, or a conversational service;

a service feature of the service, where the service feature includes any one or a combination of a size of the data packet of the service, a transmission interval of the data packet, a delay requirement of the data packet, or a rate requirement of the data packet;

quality of service (QoS) corresponding to the service;

a quality of service class identifier (QCI) parameter; or at least one of the following: an address of a source server corresponding to the service, an address of a destination server corresponding to the service, or an access point name corresponding to the service;

The receiver 402 is configured to receive a response message transmitted by the first control node in response to the request message, where the response message includes configuration information of the transmission bearer; and The processor 403 is configured to set up the transmission bearer with the first control node according to the configuration information.

Embodiment 5

Figure 5:
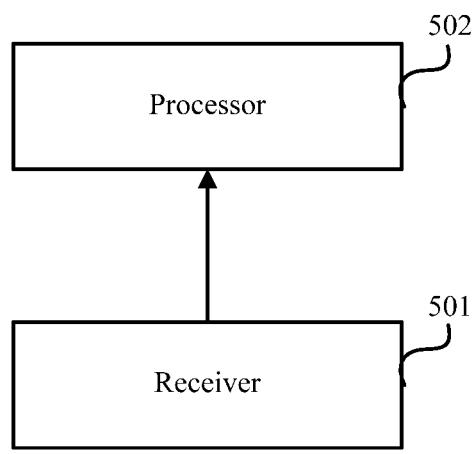
FIG. 5 is a schematic structural diagram of a control node according to Embodiment 5 of the present invention.

As shown in FIG. 5, this embodiment provides a control node, and the control node includes: a receiver 501, configured to receive a request message transmitted by user equipment, where the request message is used to request setup of a transmission bearer for transmitting a data packet of a service, and the request message includes a parameter of the service; and a processor 502, configured to correspondingly generate a first response message according to the parameter of the service, where the response message includes configuration information of the transmission bearer; and the configuration information is used to set up the transmission bearer between the first control node and the user equipment.

The parameter of the service that is obtained by the processor 502 from the request message includes:
- a service type of the service, where the service type includes any one or a combination of an ultra-reliable service, a short delay service, a small-sized packet transmission service, a streaming service, or a conversational service;
- a service feature of the service, where the service feature includes any one or a combination of a size of the data packet of the service, a transmission interval of the data packet, a delay requirement of the data packet, or a rate requirement of the data packet;
- quality of service (QoS) corresponding to the service;
- a quality of service class identifier (QCI) parameter; or
- at least one of the following: an address of a source server corresponding to the service, an address of a destination server corresponding to the service, or an access point name corresponding to the service.

In this embodiment, a second control node may further exist in a network side device. In this embodiment of the present invention, the second control node and the first control node may be in a same standard network or may be in different system networks. For example, in an evolved universal terrestrial radio access network (E-UTRAN) system, the first control node is an evolved Node B (eNB), and the second control node is a mobility management entity (MME) node in a core network. The first control node may further exchange related information with the second control node, and specific implementation may be the following steps.

1. The first control node exchanges information of the user equipment admitted by the first control node with the second control node. Specifically, the first control node further includes: a first transmitter, configured to transmit indication information to the second control node, where the indication information is used to indicate that the first control node agrees to set up the transmission bearer with the user equipment.

2. The first control node exchanges setup information of the data transmission channel between the first control node and the second control node with the second control node.

Specifically, the first control node further includes: a second transmitter, configured to transmit a transmission bearer setup request to the second control node, where the transmission bearer setup request is used to request setup of a data transmission channel between the first control node and the second control node; correspondingly, the receiver 501 is further configured to receive a feedback message of the second control node in response to the transmission bearer setup request, where the feedback message includes an address of the data transmission channel on the second control node; and the processor 502 is further configured to set up the data transmission channel with the second control node according to the address of the data transmission channel on the second control node.

In this embodiment, the first transmitter and the second transmitter indicate division of functional modules, and the first receiver and the second receiver may be implemented by using a same module in specific application.

3. The first control node exchanges admission reference information of the second control node with the second control node. Specifically, the first control node further includes: the receiver 501 is further configured to receive admission parameter information of the second control node, where the admission parameter information includes one or a combination of load information, bandwidth information, capacity information, or a supported service parameter of the second control node; and the processor 502 is further configured to determine, according to the admission parameter information, whether to set up the transmission bearer with the user equipment.

Embodiment 6

Figure 6:
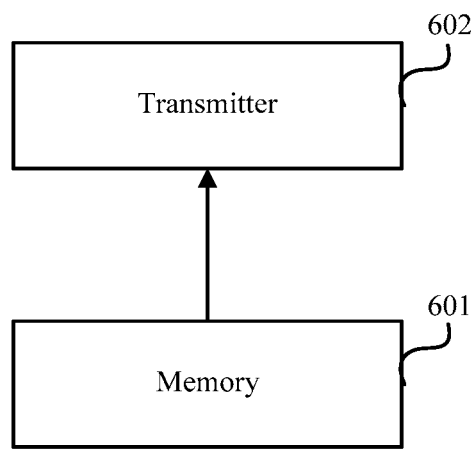
FIG. 6 is a schematic structural diagram of a control node according to Embodiment 6 of the present invention.

As shown in FIG. 6, this embodiment of the present invention further provides another control node, and the control node specifically includes: a memory 601, configured to store admission parameter information; and a transmitter 602, configured to transmit the admission parameter information to a first control node, so that the first control node determines, according to the admission parameter information, whether to set up a transmission bearer with user equipment, where the admission parameter information is used to indicate a type of a service or device admitted by the second control node.

The admission parameter information transmitted by the transmitter 602 includes one or a combination of load information, bandwidth information, capacity information, or a supportable service parameter of the second control node.

The transmitter 602 transmits an admission parameter to the first control node at a specified opportunity, and specific implementation can be: the transmitter 602 is further specifically configured to periodically transmit the admission parameter information to the first control node; transmit the admission parameter information to the first control node after admission parameter transmission request information of the first control node is received; or transmit the admission parameter information to the first control node when the control node detects that the admission parameter information of the second control node is changed.

Optionally, the control node may further include: a first receiver, configured to receive indication information transmitted by the first control node, where the indication information is used to indicate that the first control node agrees to set up the transmission bearer with the user equipment.

Optionally, an inter-node transmission bearer may be further set up between the first control node and the second control node. Specifically, the second control node may further include: a second receiver, configured to receive a transmission bearer setup request transmitted by the first control node, where the transmission bearer setup request is used to set up a data transmission channel between the first control node and the second control node; and a processor, configured to obtain an address of the data transmission channel on the first control node from the transmission bearer setup request, and set up the data transmission channel with the first control node according to the address of the data transmission channel on the first control node.

In this embodiment, the first transmitter and the second transmitter indicate division of functional modules, and the first receiver and the second receiver may be implemented by using a same module in specific application.

The foregoing one or more technical solutions in the embodiments of this application have at least the following technical effects.

In the solution, by directly performing user bearer allocation by a network side device that receives a bearer setup request message of user equipment, a process of service bearer setup of the user equipment can be quickly complete, so as to shorten a service setup delay of the user equipment, and reduce a signaling interworking process of an air interface.

The method of the present invention is not limited to the embodiments described in the specific implementations. Other implementations obtained by a person skilled in the art according to the technical solutions of the present invention also fall within the technical innovation scope of the present invention.

Obviously, a person skilled in the art can make various modifications and variations to the present invention without departing from the spirit and scope of the present invention. The present invention is intended to cover these modifications and variations provided that they fall within the scope of protection defined by the following claims and their equivalent technologies.

What is claimed is:

1. An evolved Node B (eNB), comprising:
   a receiver, the receiver configured to:
   receive a request message transmitted by a user equipment, wherein the request message is used to request setup of a transmission bearer for transmitting a data packet of a service, and the request message comprises a parameter of the service; and
   receive, from a control node, admission parameter information of the control node, wherein the admission parameter information comprises at least one of load information, bandwidth information, capacity information, or a supported service parameter of the control node; and
   at least one processor, the at least one processor configured to:
   determine, based on the parameter of the service from the user equipment and the admission parameter information from the control node, whether to set up the transmission bearer with the user equipment; and
   in response to determining to set up the transmission bearer, generate a response message, wherein the response message comprises configuration information of the transmission bearer, and the configuration information is used to set up the transmission bearer between the eNB and the user equipment.

2. The eNB according to claim 1, wherein the parameter of the service in the request message comprises:
   a service type of the service, wherein the service type comprises at least one of an ultra-reliable service, a short delay service, a small-sized packet transmission service, a streaming service, or a conversational service;
   a service feature of the service, wherein the service feature comprises at least one of a size of the data packet of the service, a transmission interval of the data packet, a delay requirement of the data packet, or a rate requirement of the data packet;
   a quality of service (QoS) corresponding to the service;
   a quality of service class identifier (QCI) parameter; or
   at least one of: an address of a source server corresponding to the service, an address of a destination server corresponding to the service, or an access point name corresponding to the service.

3. The eNB according to claim 1, wherein the eNB further comprises:
   a first transmitter, the first transmitter configured to transmit indication information to the control node, wherein the indication information is used to indicate that the eNB agrees to set up the transmission bearer with the user equipment.

4. The eNB according to claim 1, wherein the eNB further comprises:
   a second transmitter, the second transmitter configured to transmit a transmission bearer setup request to the control node, wherein the transmission bearer setup request is used to request setup of a data transmission channel between the eNB and the control node;
   wherein the receiver is further configured to receive a feedback message from the control node in response to the transmission bearer setup request, wherein the feedback message comprises an address of the data transmission channel on the control node; and
   wherein the at least one processor is further configured to set up the data transmission channel with the control node according to the address of the data transmission channel on the control node.

5. The eNB according to claim 1, wherein the request message is a radio resource control (RRC) connection setup request message.

6. A method, comprising:
   receiving, by an evolved Node B (eNB), a request message transmitted by a user equipment, wherein the request message is used to request setup of a transmission bearer for transmitting a data packet of a service, and the request message comprises a parameter of the service;
   receiving, by the eNB and from a control node, admission parameter information of the control node, wherein the admission parameter information comprises at least one of load information, bandwidth information, capacity information, or a supported service parameter of the control node;
   determining, by the eNB and based on the parameter of the service from the user equipment and the admission parameter information from the control node, whether to set up the transmission bearer with the user equipment; and
   in response to determining to set up the transmission bearer, generate, by the eNB, a response message, wherein the response message comprises configuration information of the transmission bearer, and the configuration information is used to set up the transmission bearer between the eNB and the user equipment.

7. The method according to claim 6, wherein the parameter of the service in the request message comprises:
   a service type of the service, wherein the service type comprises at least one of an ultra-reliable service, a short delay service, a small-sized packet transmission service, a streaming service, or a conversational service;
   a service feature of the service, wherein the service feature comprises at least one of a size of the data packet of the service, a transmission interval of the data packet, a delay requirement of the data packet, or a rate requirement of the data packet;
   a quality of service (QoS) corresponding to the service;
   a quality of service class identifier (QCI) parameter; or
   at least one of: an address of a source server corresponding to the service, an address of a destination server corresponding to the service, or an access point name corresponding to the service.

8. The method according to claim 6, the method further comprising transmitting indication information to the control node, wherein the indication information is used to indicate that the eNB agrees to set up the transmission bearer with the user equipment.

9. The method according to claim 6, the method further comprising:
- transmitting a transmission bearer setup request to the control node, wherein the transmission bearer setup request is used to request setup of a data transmission channel between the eNB and the control node;
- receiving a feedback message from the control node in response to the transmission bearer setup request, wherein the feedback message comprises an address of the data transmission channel on the control node; and
- setting up the data transmission channel with the control node according to the address of the data transmission channel on the control node.

10. The method according to claim 6, wherein the request message is a radio resource control (RRC) connection setup request message.

11. A non-transitory computer readable storage medium storing executable instructions that cause a computer to perform operations comprising:
- receiving, by an evolved Node B (eNB), a request message transmitted by a user equipment, wherein the request message is used to request setup of a transmission bearer for transmitting a data packet of a service, and the request message comprises a parameter of the service;
- receiving, by the eNB and from a control node, admission parameter information of the control node, wherein the admission parameter information comprises at least one of load information, bandwidth information, capacity information, or a supported service parameter of the control node;
- determining, by the eNB and based on the parameter of the service from the user equipment and the admission parameter information from the control node, whether to set up the transmission bearer with the user equipment; and
- in response to determining to set up the transmission bearer, generate, by the eNB, a response message, wherein the response message comprises configuration information of the transmission bearer, and the configuration information is used to set up the transmission bearer between the eNB and the user equipment.

12. The non-transitory computer readable storage medium according to claim 11, wherein the parameter of the service in the request message comprises:
- a service type of the service, wherein the service type comprises at least one of an ultra-reliable service, a short delay service, a small-sized packet transmission service, a streaming service, or a conversational service;
- a service feature of the service, wherein the service feature comprises at least one of a size of the data packet of the service, a transmission interval of the data packet, a delay requirement of the data packet, or a rate requirement of the data packet;
- a quality of service (QoS) corresponding to the service;
- a quality of service class identifier (QCI) parameter; or
- at least one of: an address of a source server corresponding to the service, an address of a destination server corresponding to the service, or an access point name corresponding to the service.

13. The non-transitory computer readable storage medium according to claim 11, the operations further comprising transmitting indication information to the control node, wherein the indication information is used to indicate that the eNB agrees to set up the transmission bearer with the user equipment.

14. The non-transitory computer readable storage medium according to claim 11, the operations further comprising:
- transmitting a transmission bearer setup request to the control node, wherein the transmission bearer setup request is used to request setup of a data transmission channel between the eNB and the control node;
- receiving a feedback message from the control node in response to the transmission bearer setup request, wherein the feedback message comprises an address of the data transmission channel on the control node; and
- setting up the data transmission channel with the control node according to the address of the data transmission channel on the control node.

15. The non-transitory computer readable storage medium according to claim 11, wherein the request message is a radio resource control (RRC) connection setup request message.

16. A method, comprising:
- transmitting, by a user equipment, a request message to an evolved Node B (eNB), wherein the request message is used to request setup of a transmission bearer for transmitting a data packet of a service, and the request message comprises a parameter of the service; and
- receiving, by the use equipment from the eNB, a response message after the eNB receives, from a control node, admission parameter information of the control node, and determines based on the parameter of the service and the admission parameter information, whether to set up the transmission bearer with the user equipment;
- wherein the admission parameter information comprises at least one of load information, bandwidth information, capacity information, or a supported service parameter of the control node; and
- wherein the response message comprises configuration information of the transmission bearer, and the configuration information is used to set up the transmission bearer between the eNB and the user equipment.

17. The method according to claim 16, wherein the parameter of the service in the request message comprises:
- a service type of the service, wherein the service type comprises at least one of an ultra-reliable service, a short delay service, a small-sized packet transmission service, a streaming service, or a conversational service;
- a service feature of the service, wherein the service feature comprises at least one of a size of the data packet of the service, a transmission interval of the data packet, a delay requirement of the data packet, or a rate requirement of the data packet;
- a quality of service (QoS) corresponding to the service;
- a quality of service class identifier (QCI) parameter; or
- at least one of: an address of a source server corresponding to the service, an address of a destination server corresponding to the service, or an access point name corresponding to the service.

18. The method according to claim 16, wherein the request message is a radio resource control (RRC) connection setup request message.

19. A user equipment, comprising:
- a transmitter, configured to transmit a request message to an evolved Node B (eNB), wherein the request message is used to request setup of a transmission bearer for transmitting a data packet of a service, and the request message comprises a parameter of the service; and
- a receiver, configured to receive from the eNB a response message after the eNB receives, from a control node, admission parameter information of the control node, and determines based on the parameter of the service and the admission parameter information, whether to set up the transmission bearer with the user equipment;

wherein the admission parameter information comprises at least one of load information, bandwidth information, capacity information, or a supported service parameter of the control node; and wherein the response message comprises configuration information of the transmission bearer, and the configuration information is used to set up the transmission bearer between the eNB and the user equipment.

20. The user equipment according to claim 19, wherein the parameter of the service in the request message comprises:

a service type of the service, wherein the service type comprises at least one of an ultra-reliable service, a short delay service, a small-sized packet transmission service, a streaming service, or a conversational service;

a service feature of the service, wherein the service feature comprises at least one of a size of the data packet of the service, a transmission interval of the data packet, a delay requirement of the data packet, or a rate requirement of the data packet;

a quality of service (QoS) corresponding to the service;

a quality of service class identifier (QCI) parameter; or at least one of: an address of a source server corresponding to the service, an address of a destination server corresponding to the service, or an access point name corresponding to the service.

21. The user equipment according to claim 19, wherein the request message is a radio resource control (RRC) connection setup request message.

* * * * *